United States Patent [19]

Zafiroglu

[11] Patent Number: 4,737,394

[45] Date of Patent: Apr. 12, 1988

[54] ARTICLE FOR ABSORBING OILS

[75] Inventor: Dimitri P. Zafiroglu, Greenville, Del.

[73] Assignee: E. I. Du Pont de Nemours and Company, Wilmington, Del.

[21] Appl. No.: 63,303

[22] Filed: Jun. 17, 1987

[51] Int. Cl.$^4$ .............................................. B32B 3/06

[52] U.S. Cl. .................................. 428/102; 210/502.1; 210/924; 428/105; 428/240; 428/257; 428/283; 428/297; 428/327; 428/340; 428/224; 428/229; 428/913

[58] Field of Search ............... 428/102, 240, 257, 283, 428/297, 327, 340, 913, 105, 224, 226, 229, 230, 231; 210/924, 242.4, 680, 693, 502.1

[56] References Cited

U.S. PATENT DOCUMENTS

| | | | |
|---|---|---|---|
| 3,468,748 | 9/1969 | Bassett | 161/122 |
| 3,649,427 | 3/1972 | Hughes | 428/102 |
| 3,649,428 | 3/1972 | Hughes | 161/50 |
| 3,769,815 | 11/1973 | Ploch et al. | 66/85 A |
| 4,071,647 | 1/1978 | McMullen | 428/102 |
| 4,107,051 | 8/1978 | Lorentzen | 210/924 |
| 4,395,336 | 7/1983 | Eng | 428/257 |
| 4,437,865 | 3/1984 | Parekh et al. | 428/102 |
| 4,497,712 | 2/1985 | Cowling | 210/924 |
| 4,606,964 | 8/1986 | Wideman | 428/152 |
| 4,657,802 | 4/1987 | Morman | 428/152 |
| 4,675,226 | 6/1987 | Ott | 428/102 |

OTHER PUBLICATIONS

W. Bahlo, "New Fabrics Without Weaving", Paper of the American Association for Textile Technology, Inc., pp. 51–54 (Nov. 1965).

Product Licensing Index, Research Disclosure, "Stitch-bonded Products of Continuous Filament Nonwoven Webs", p. 30, (Jun. 1968).

Primary Examiner—James J. Bell

[57] ABSTRACT

An oil-absorbing article comprises a porous outer fabric which encloses fibrous oil-absorbing particles. The porous fabric of the invention is a nonwoven fibrous polyolefin layer of polyethylene or polypropylene that is stitch-bonded with an elastic thread.

8 Claims, No Drawings 4,737,394

ARTICLE FOR ABSORBING OILS

BACKGROUND OF THE INVENTION

1. Field of the Invention

This invention relates to an oil-absorbing article that has a porous outer fabric which surrounds a fibrous absorbent material. More particularly, the invention concerns such an article in which the porous fabric is a stitch-bonded, nonwoven, fibrous layer of polyethylene or polypropylene. The outer fabric of the oil-absorbing article of the invention permits oils to penetrate readily to the absorbent material without becoming blocked by water; such blockage occurs with other knitted or woven outer fabrics.

2. Description of the Prior Art

Various articles are known for absorbing and preventing the spread of spilled oil. Among such articles for use in cleaning an oil spill from a body of water are a floating mat of polyethylene fibers and wood fibers held within an open-mesh netting, an oil-scrubber belt which has a polypropylene batting held by a nylon netting, and a boom in which polyolefin microfibers, cellulosic fibers and/or ground polymeric material are contained in a net-like sleeve.

A commercial article in which melt-blown polypropylene microfibers are enclosed within a porous, knitted or woven fabric has been used to absorb oils. However, when this latter type of article is used to absorb oil in an aqueous environment, the woven or knitted outer fabric has been found to become clogged or blocked with water before the microfibers can become saturated with the oil. An object of the present invention is to provide an improved oil-absorbing article that has an outer fabric which does not become clogged, permits rapid passage of oil through it and prevents the particulate or loose absorbent material from becoming dislodged from within the fabric. In addition, for enhanced performance of the improved oil-absorbing article, the article should be capable of floating on water, before and after becoming saturated with oil, and should be capable of being reused after absorbed oil has been squeezed or wrung out of the article.

SUMMARY OF THE INVENTION

The present invention provides an improved oil-absorbing article of the type that has a porous outer fabric enclosing fibrous absorbent particles. According to the improvement of the present invention, the outer fabric is a nonwoven, fibrous polyolefin layer of polyethylene or polypropylene that is stitch-bonded with elastic thread. The thread forms spaced apart rows of stitches extending along the length of the fabric. Row spacing is in the range of 2 to 10 rows per centimeter and the stitch spacing is in the range of 2 to 15 per centimeter. The stitching thread amounts to 2 to 40% of the total weight of the outer fabric and the outer fabric has a unit weight in the range of 30 to 250 grams per square meter. Preferably, the fibrous polyolefin layer is formed of nonbonded, plexifilamentary, film-fibril strands of polyethylene. A spandex elastomeric yarn is preferred for the stitching thread.

DETAILED DESCRIPTION OF PREFERRED EMBODIENTS

The invention will now be described in detail with regard to preferred embodiments of the improved oil-absorbing article of the invention.

As used herein, the term "polyethylene" is intended to embrace not only homopolymers of ethylene but also copolymers wherein at least 85% of the recurring units are ethylene units. Similarly, the term "polypropylene" is intended to embrace homopolymers and copolymers of propylene wherein at least 85% of the recurring units are propylene units. The preferred polyethylene for the nonwoven fibrous polyolefin layer of the stitch-bonded outer fabric is a homopolymeric linear polyethylene which has an upper limit of melting range of about 134° to 135° C. (as measured by differential thermal analysis with the sample being heated to increase its temperature 10° C. per minute), a density in the range of 0.94 to 0.96 g/cm$^2$, and a melt index of 0.1 to 6.0 (as measured by ASTM D-1238-57T, Condition E).

As used herein, the term "stitch-bonded" refers to the result of a multi-needle stitching operation performed on a nonwoven fibrous polyolefin layer used for preparing the outer fabric of the oil-absorbent article of the invention. The stitch-bonding can be performed with conventional multi-needle stitching equipment, such as "Arachne" or "Mali" (including Malimo, Malipol and Maliwatt machines). Such machines and some fabrics produced therewith are disclosed by K. W. Bahlo, "New Fabrics Without Weaving", Paper of the American Association for Textile Technology, Inc., pages 51–54 (November, 1965), by Ploch et al, U.S. Pat. No. 3,769,815, by Hughes, U.S. Pat. No. 3,649,428 and in Product Licensing Inex, Research Disclosure, "Stitch-bonded products of continuous filament nonwoven webs", page 30 (June 1968).

Substantially any elastic thread is suitable as the stitching thread for the outer fabric of the improved oil-absorbing article of the invention, provided the elastic thread exerts sufficient force to cause the fibrous nonwoven layer of polyethylene or polypropylene to contract or pucker after the stitching operation. For example, conventional yarns (e.g., spandex, rubber or textured stretch yarns) that can elongate and contract, or yarns that can be made to shrink after stitching (e.g., heat shrinkable yarns) can be used to form the required stitches.

A particularly preferred stitching thread is formed from spandex yarn that has high elongation and high retractive power. Such preferred stitching yarn is available commercially (e.g., "Lycra" spandex yarn manufactured by E. I. du Pont de Nemours and Co.). The spandex can be inserted into the sheet under tension in a stretched condition, so that when the tension is released, the retractive forces of the yarns cause the sheet to contract and pucker. Preferred stitching yarns can elongate and retract in the range of 100 to 200%. Stretch yarns, for example of nylon or polyester, can function in a similar manner to spandex yarns, but usually with considerably less elongation and retraction.

In the stitch-bonded outer fabric of the oil-absorbing article of the invention, row spacings in the range of 2 to 10 rows per centimeter are generally satisfactory; 3 to 6 rows per cm are preferred. Stitch spacings in the range of 2 to 15 stitches per cm are usually satisfactory; 3 to 10 stitches per cm are preferred. The stitching thread usually amounts to 2 to 40%, preferably 5 to 10%, of the total weight of the outer fabric.

The multi-needle stitching forms parallel chains of interlocked loops on one surface of the nonwoven fibrous polyolefin layer of the outer fabric and a parallel series of zig-zag tricot stitches on the other surface. Alternatively, the stitching can form substantially parallel rows of chain stitches along the length of the fabric. In accordance with the present invention, the stitching causes area contraction of the nonwoven fibrous layer. Chain stitches cause almost all of the contraction to take place in the direction of the stitching (i.e., along the length or longitudinal direction of the fabric). Tricot stitches cause contraction also across the width of the fabric (i.e., in the transverse direction). The rows of stitches are usually inserted by needles having a spacing in the range of 2 to 5 needles per cm and the stitches are inserted at a spacing in the range of 1 to 7 stitches per cm, preferably 2 to 5 stitches per cm.

As a result of the above-described stitch-bonding of the nonwoven fibrous polyolefin layer of polyethylene or polypropylene with the elastic thread, the outer fabric of the oil-absorbing article of the invention has sufficient porosity to permit oil to pass through rapidly to the absorbent material. Preferred nonwoven fibrous polyolefin layers for use in the present invention are substantially nonbonded; that is, the fibrous elements of the nonwoven layer preferably are substantially free of chemical or thermal bonds. Even if the nonwoven layer is initially somewhat bonded thermally or chemically, the action of the stitching and subsequent mechanical stretching and contraction of the outer fabric can open the structure sufficiently to provide the desired porosity for oil to pass readily to the absorbent material. Point-bonded nonwoven fibrous polyolefin layers are also suitable for use in the stitch-bonded outer fabric of the invention.

In a preferred embodiment of the invention, the nonwoven fibrous polyolefin layer of the stitch-bonded outer fabric is made of plexifilamentary film-fibril strands of the type disclosed by Blades et al, U.S. Pat. No. 3,018,519. The strands are formed into a lightly consolidated, nonbonded sheet by the general methods of disclosed by Steuber, U.S. Pat. No. 3,169,899, or as disclosed in greater detail by Lee, U.S. Pat. No. 4,554,207, column 4, line 63, through column 5, line 60, which disclosures are hereby incorporated by reference. Generally, for use in the oil-absorbing article of the present invention, such sheet has a unit weight in the range of 20 to 150 g/m$^2$ and a density in the range of 0.15 to 0.3 g/m$^3$. The sheet is usually wound up in a roll in preparation for subsequent feeding to the multi-needle stitching machine.

The completed outer fabric usually has a unit weight in the range of 30 to 250 g/m$^2$, preferably 75 to 175 g/m$^2$ (measured according to ASTM D 3776-79), a thickness in the range of 0.6 to 1.2 mm, preferably 0.7 to 1.0 mm (measured with a thickness gauge having a 1 cm diameter cylindrical foot loaded with a 100 gram weight), and a density in the range of 0.1 to 0.2 g/cm$^3$, preferably 0.12 to 0.17 g/cm$^3$. Preferred outer fabrics have an extensibility of at least 75% in the longitudinal direction and of at least 25% in the transverse direction (measured on a 10.2-by-10.2 cm sample under a 9.1 kg load with an Instron Tester).

The oil-absorbing material which fills the outer fabric, as is illustrated in the Examples below, can be composed substantially entirely of fine, fibrous particles of flash-spun linear polyethylene. Such particles can be prepared by flash-spinning methods disclosed in the previously mentioned British patent No. 891,945 and Blades & White U.S. Pat. No. 3,227,784. As described in detail in the Examples that follow, this particulate matter conveniently can be prepared from cut and refined pieces of the same nonbonded, lightly consolidated polyethylene nonwoven sheet as was described for preparing a preferred nonwoven fibrous polyolefin layer of the outer fabric.

Fine, fibrous particles of polyethylene suitable for use in the improved oil-absorbing article of the present invention are also available in the form of synthetic pulps (see Kirk-Othmer: Encyclopedia of Chemical Technology, Volume 19, Third Edition, John Wiley & Sons, page 420 ff, 1982). Among suitable commercial synthetic polyethylene pulps are "Pulpex" or "Fybrel", made respectively by Hercules Corp. of Wilmington, Delaware and Mitsui Petrochemical Industries Ltd. of Tokyo, Japan.

The absorbent material optionally may contain foamed organic polymer particles, of polypropylene, polyester, polystyrene or the like, usually amounting to no more than about half of the total weight of the absorbent particles. If foam particles are present, flash-spun particles of polypropylene prepared by the general techniques of Blades and White U.S. Pat. No. 3,227,664 are preferred. Whether the absorbent material is a particle blend of foamed polymer and flash-spun polyethlene or of flash-spun polyethylene alone, the preferred range for the apparent bulk density of the absorbent material usually is from 0.045 to 0.075 grams/cm$^3$, most preferably, from 0.05 to 0.07 g/cm$^3$. The low-density absorbent material and lightweight outer fabric results in an oil-absorbing article that can float on water, even when saturated with oil.

Apparent bulk density of the absorbent material is measured by pouring a hand-mixed sample of the particles of absorbent material into a glass cylinder of about 6½ cm diameter until a volume of 535 cm$^3$ is reached. This volume corresponds to the volume of the liquid-absorbing specimens used for the examples below. The weight of the absorbent material in grams divided by the 535 cm$^3$ volume is defined as the bulk density of the absorbent material.

In the examples which follow, fibrous, flash-spun polyethylene particles were prepared from cut and refined pieces of a nonwoven polyethylene sheet. Linear polyethylene, having a density of 0.95 g/cm$^3$, a melt index of 0.9 (as determined by ASTM method D 1238-57T, Condition E), and a melting peak of about 135° C., was flash spun from a 12% solution of the polymer in trichlorofluoromethane. The solution was continuously pumped to spinneret assemblies at a temperature of 179° C. and a pressure of about 85 atmospheres. The solution was passed in each spinneret assembly through a first orifice to a pressure let-down zone and through a second orifice into the surrounding atmosphere. The resulting strand or plexifilament was a three-dimensional plexus of interconnecting, film-fibril elements of random length. The film-fibril elements had the form of thin ribbons of less than 4 microns in thickness. The strand was spread and oscillated by means of a rotating shaped baffle, was electrostatically charged and then deposited on a moving belt. The spinneret assemblies were spaced to provide overlapping, intersecting deposits on the belt to form a sheet. The sheet was then lightly consolidated by passage through the nip of rollers that applied to the sheet a compression of about 1.8 kg per cm of sheet width. The lightly consolidated sheets had a unit weight in the range of 25 to 75 g/m$^2$ and a density in the range of 0.15 to 0.3 g/cm$^3$.

The thusly produced sheet was slit into strips. The strips were cut into short lengths and then granulated into smaller pieces in a Sprout-Bauer DSF-1518 granulator equipped with an exit screen having 0.48 by 0.48 cm openings. The granules were further reduced in size to form a pulp in a Model 3A Ultra-Rotor mill (distributed by Industrial Process Equipment Co. of Pennsauken, New Jersey) having blades of 71 cm (28 in) diameter, operated at 2100 rpm rotation speed, with a blade clearance of about 3 mm (i.e., in the range of 1-5 mm). The resultant fibrous polyethylene particle pulp exhibited a drainage factor of 0.12, and a surface area of 1.7 m$^2$/g. Drainage factor was determined in accordance with a modified TAPPI T221 OS-63 test, as disclosed in U.S. Pat. No. 3,920,507. TAPPI refers to the Technical Association of Paper and Pulp Industry. Surface area was measured by the BET nitrogen absorption method of S. Brunauer, P. H. Emmett and E. Teller, *J. Am. Chem. Soc.*, v. 60, 309-319 (1938).

The effectiveness of an oil-absorbing article to perform its oil-absorption function, even after it has been in contact with water for an extended time, was measured by an "oil-on-water absorption test". In this test, a test article is contacted initially only by water and then after two hours, is exposed to oil floating on water. For the test, 260 grams of water is poured into a rectangular pan, measuring about 20 cm by 13 cm in cross-section, to form a depth of about 1.3 cm of water. A preweighed sausage-shaped test specimen, having a diameter of about 6½ cm and a length of about 15 cm between end closures and containing about 30 grams of the above-described oil-absorbing flash-spun polyethylene particles, is placed on the surface of the water. After two hours, the test specimen is removed from the water and reweighed. A weight of 260 grams of hydraulic oil is then added to the water in the pan. The test specimen is replaced in the pan for an additional hour and then removed. The liquid remaining in the pan is poured into a separatory funnel and allowed to separate. The separated water and oil are weighed to determine the amount of water and oil that was not absorbed. The difference between the original 260 grams of oil added to the pan and the amount not absorbed equals the amount of oil that was absorbed by the test specimen. The amount of water absorbed is calculated in a similar manner.

EXAMPLES 1 and 2

These examples demonstrate the marked advantage of oil-absorbing articles of the invention over certain known types of oil-absorbing articles, particularly in their ability to absorb oil, even after the article has been exposed to water for an extended period. Specimens of each oil-absorbing article were made for testing according to the "oil-on-water absorption test". The examples of the invention had outer fabrics which included nonwoven fibrous polyolefin layers of flash-spun polyethylene (Example 1) and of small textile denier polypropylene (Example 2). The outer fabrics of the comparison specimens were knitted fabrics made respectively from polyester yarns (Comparison A) and polypropylene yarns (Comparison B). The comparison specimen outer fabrics were obtained from commercial oil-absorbing "Pigs" sold by New Pig Corporation of Altoona, Pa.

The starting material for the nonwoven layer of the outer fabric layer of the oil-absorbing specimen of Example 1, was a lightly consolidated, nonbonded nonwoven sheet of polyethylene plexifilamentary film-fibril strands, having a thickness of about 0.22 mm and a unit weight of about of 44 g/m$^2$. For Example 2, the starting material was a point-bonded sheet of 1.5 dpf (1.7 dtex) polypropylene filaments, manufactured by Polybond, Inc., of Waynesboro, Virginia, having a thickness of about 0.20 mm and a unit weight of about 34 g/m$^2$. Each of these starting materials was stitched with a tensioned 40 dpf (44 dtex) spandex elastomeric thread ("Lycra" manufactured by E. I. du Pont de Nemours and Company of Waynesboro, Va.) wrapped with 20 dpf (22 dtex) nylon. A multi-needle, single-bar Malimo machine was employed to insert 12 stitches per 25 mm, each of 1.8 mm length. Chain stitches were employed for the specimen of Example 1; tricot stitches for the specimen of Example 2. The total weight, unit weight, thickness, density (calculated from the unit weight and thickness measurements) and extensibility of the outer fabric, after being removed from the multi-needle stitching machine, are listed in Table I below.

TABLE I

| Characteristics of Outer Fabrics | | | | |
|---|---|---|---|---|
| | Examples | | Comparisons | |
| | 1 | 2 | A | B |
| Unit weight, g/m$^2$ | 146 | 102 | 105 | 112 |
| Thickness, mm | 0.91 | 0.77 | 0.20 | 0.21 |
| Density, g/cm$^3$ | 0.16 | 0.13 | 0.53 | 0.55 |
| % Extensibility | | | | |
| Longitudinal | 250 | 105 | 28 | 28 |
| Transverse | 38 | 41 | 53 | 72 |

Note the much lower density and the much higher thickness (bulk) and extensibility of the outer fabrics intended for use in the oil-absorbing articles of the invention.

Each of the outer fabrics was formed into sausage-shaped test specimen. Each specimen was then filled with oil-absorbing, flash-spun polyethylene particles of the type described hereinbefore. The filled specimens were then tested for oil absorption capacity in accordance with oil-on-water absorption test. Test results are listed in Table II.

TABLE II

| Oil Absorption Tests[1] | | | | |
|---|---|---|---|---|
| | Examples | | Comparisons | |
| | 1 | 2 | A | B |
| Water absorbed in first two hours[2] | 3 | 3 | 28 | 178 |
| Total absorbed[3] | | | | |
| Water | 18 | 9 | 57 | 127 |
| Oil | 246 | 248 | 43 | 201 |

Notes:
[1] All absorbed amounts in grams.
[2] After exposure to water only.
[3] After further exposure for one hour to oil on water and calculated from the separated amounts of oil and water that were not absorbed.

The test results summarized in Table II show the superiority of the oil-absorbing articles of the invention with their stitch-bonded outer fabrics over the oil-absorbing comparison articles with their knitted outer fabrics. The two specimens of the invention exhibited a highly selective ability to absorb oil. They absorbed substantially all of the oil from the reservoir pan, with very little accompanying water. Furthermore, the water remaining in the pan after the three-hour test of the Example 1 and 2 specimens was substantially clear;

much oil remained after testing of Comparisons A and B.

About 200 grams of oil were wrung by hand from each of tested Samples 1 and 2. Oil-on-water absorption tests were repeated. The samples readily reabsorbed about an equal quantity of oil as was wrung out, even after the procedure was repeated several times.

I claim:

1. An improved oil-absorbing article having a porous outer fabric which encloses fibrous absorbent particles, the improvement comprising the outer fabric being a nonwoven fibrous polyolefin layer of polyethylene or polypropylene that is stitch-bonded with an elastic thread that forms spaced apart rows of stitches extending along the length of the fabric, the row spacing being in the range of 2 to 10 rows per centimeter and the stitch spacing being in the range of 2 to 15 per centimeter, the stitching thread amounting to 2 to 40% of the total weight of the outer fabric and the outer fabric having a unit weight in the range of 30 to 250 grams per square meter.

2. An oil-absorbing article in accordance with claim 1 wherein the row spacing is in the range of 3 to 6 rows/cm, the stitch spacing is in the range of 3 to 10 stitches per inch, the stitching thread amounts to 5 to 10% of the total weight of the outer fabric, and the outer fabric has a unit weight in the range of 75 to 175 g/m$^2$.

3. An oil-absorbing article in accordance with claim 1 or 2 wherein the thickness of the outer fabric is in the range of 0.6 to 1.2 mm and the density of the fabric is in the range of 0.1 to 0.2 g/cm$^3$.

4. An oil-absorbing article in accordance with claim 1, 2 or 3 wherein the nonwoven fibrous polyolefin layer is formed of nonbonded, plexifilamentary, polyethylene film-fibril strands.

5. An oil-absorbing article in accordance with claim 1, 2 or 3 wherein the nonwoven fibrous polyolefin layer is formed of polypropylene fibers of no more than 3.5 dtex.

6. An oil-absorbing article in accordance with claim 1, 2 or 3 wherein the stitching yarn is a spandex elastomeric yarn.

7. An oil absorbing article in accordance with claims 1, 2 or 3 wherein the extensibility of the outer fabric is at least 75% in the longitudinal direction and at least 25% in the transverse direction.

8. An oil-absorbing article in accordance with claim 1, 2 or 3 wherein the fibrous absorbent particles include flash-spun linear polyethylene particles.

* * * * *